(12) United States Patent
Tamura et al.

(10) Patent No.: US 10,452,859 B2
(45) Date of Patent: Oct. 22, 2019

(54) FILE SYSTEM METADATA PROTECTION

(71) Applicant: Apple Inc., Cupertino, CA (US)

(72) Inventors: Eric B. Tamura, Sunnyvale, CA (US);
Wade Benson, San Jose, CA (US);
John Garvey, Victoria (CA)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 15/275,289

(22) Filed: Sep. 23, 2016

(65) Prior Publication Data

US 2017/0357817 A1    Dec. 14, 2017

Related U.S. Application Data

(60) Provisional application No. 62/348,617, filed on Jun. 10, 2016.

(51) Int. Cl.
*G06F 21/62* (2013.01)
*G06F 21/60* (2013.01)
*H04L 9/14* (2006.01)
*G06F 21/31* (2013.01)

(52) U.S. Cl.
CPC .......... *G06F 21/6218* (2013.01); *G06F 21/31* (2013.01); *G06F 21/602* (2013.01); *H04L 9/14* (2013.01)

(58) Field of Classification Search
CPC .................................................. G06F 21/6218
See application file for complete search history.

(56) References Cited

U.S. PATENT DOCUMENTS

| | | | | | |
|---|---|---|---|---|---|
| 3,777,074 | A | * | 12/1973 | Olmsted | G11B 15/04 340/679 |
| 5,144,659 | A | * | 9/1992 | Jones | G06F 21/6218 340/5.74 |
| 7,739,301 | B2 | * | 6/2010 | Bojinov | G06F 16/10 707/782 |
| 7,752,176 | B1 | * | 7/2010 | Kushwah | G06F 16/10 707/679 |

(Continued)

OTHER PUBLICATIONS

Heurix et al.; Pseudonymization with Metadata Encryption for Privacy-Preserving Searchable Documents; Published in: 2012 45th Hawaii International Conference on System Sciences; Date of Conference: Jan. 4-7, 2012; IEEE Xplore (Year: 2012).*

(Continued)

*Primary Examiner* — Bradley W Holder
(74) *Attorney, Agent, or Firm* — Meyertons, Hood, Kivlin, Kowert & Goetzel, P.C.

(57) ABSTRACT

Techniques are disclosed relating to securely storing file system metadata in a computing device. In one embodiment, a computing device includes a processor, memory, and a secure circuit. The memory has a file system stored therein that includes metadata for accessing a plurality of files in the memory. The metadata is encrypted with a metadata encryption key that is stored in an encrypted form. The secure circuit is configured to receive a request from the processor to access the file system. In response to the request, the secure circuit is configured to decrypt the encrypted form of the metadata encryption key. In some embodiments, the computing device includes a memory controller configured to receive the metadata encryption key from the secure circuit, retrieve the encrypted metadata from the memory, and decrypt the encrypted metadata prior to providing the metadata to the processor.

9 Claims, 8 Drawing Sheets

(56) References Cited

U.S. PATENT DOCUMENTS

| | | | | |
|---|---|---|---|---|
| 7,814,554 B1* | 10/2010 | Ragner | ............... | G06F 21/52 |
| | | | | 713/165 |
| 8,161,012 B1* | 4/2012 | Gerraty | ............... | G06F 21/53 |
| | | | | 707/687 |
| 8,261,033 B1* | 9/2012 | Slik | ............... | G06F 3/067 |
| | | | | 711/111 |
| 8,392,479 B1* | 3/2013 | Pantin | ............... | G06F 16/182 |
| | | | | 707/823 |
| 8,751,828 B1* | 6/2014 | Raizen | ............... | G06F 21/6218 |
| | | | | 380/278 |
| 8,924,355 B1* | 12/2014 | Kundzich | ............... | G06F 11/1448 |
| | | | | 707/647 |
| 2011/0252234 A1* | 10/2011 | De Atley | ............... | H04L 9/0891 |
| | | | | 713/165 |
| 2013/0305039 A1* | 11/2013 | Gauda | ............... | G06F 21/6218 |
| | | | | 713/153 |
| 2014/0049653 A1* | 2/2014 | Leonard | ............... | G06T 1/0042 |
| | | | | 348/207.1 |
| 2016/0078243 A1* | 3/2016 | Bruso | ............... | G06F 21/6218 |
| | | | | 726/27 |
| 2016/0078244 A1* | 3/2016 | Bruso | ............... | G06F 21/6218 |
| | | | | 713/189 |
| 2016/0300080 A1* | 10/2016 | Shah | ............... | H04L 9/0822 |

OTHER PUBLICATIONS

Ueno et al.; Disaster recovery mechanism using widely distributed networking and secure metadata handling technology; '09 Proceedings of the 4th edition of the UPGRADE-CN workshop on Use of P2P, GRID and agents for the development of content networks; pp. 45-48; 2009; ACM Digital Library (Year: 2009).*

* cited by examiner

FILE SYSTEM METADATA PROTECTION

This application claims the benefit of U.S. Prov. Appl. No. 62/348,617 filed on Jun. 10, 2016, which is incorporated by reference herein in its entirety.

BACKGROUND

Technical Field

This disclosure relates generally to computing devices, and, more specifically, to computing devices that support secure data storage.

Description of the Related Art

Modern computing devices often maintain a file system to organize the storage of information in a storage medium. In such a system, blocks of data are typically grouped into files, which, in turn, may be placed into directories. In order to enable access to stored information, a file system may maintain various forms of metadata about the data being stored by the file system. In the case of the file allocation table (FAT) file system, for example, an index table (called the file allocation table) may be used to track which clusters are allocated to particular files. Directory files may also be used to identify which files are in a given directory, the names assigned to those files, the parent and child directories. When a file is accessed, this metadata may be accessed to determine where blocks of a file are located on the medium. More advanced file systems may also maintain forms of metadata for other various purposes. In file systems that support journaling, such as the new technology file system (NTFS), log information may be stored to track when information is stored in a medium. In the event data becomes corrupted, the log information may be used to recover the stored information to previous state.

SUMMARY

The present disclosure describes embodiments in which metadata maintained for a file system is encrypted. In various embodiments, a computing device includes a memory having a file system stored therein that includes metadata for accessing the files in the memory. To protect this metadata, the metadata is encrypted with a metadata encryption key that is stored in an encrypted form. The computing device may include a secure circuit configured to receive a request from a processor in the computing device to access the file system. In response to the request, the secure circuit may decrypt the encrypted form of the metadata encryption key. In some embodiments, the secure circuit sends the metadata encryption key to a memory controller configured to retrieve the encrypted metadata from the memory and decrypt the encrypted metadata with the metadata encryption key. In various embodiments, the secure circuit restricts use of the metadata encryption key by encrypting the metadata encryption key with entropy supplied by a user (e.g. a user credential) and/or entropy supplied by hardware in the computing device (e.g., an unique identity key stored in the secure circuit).

Figure 1:
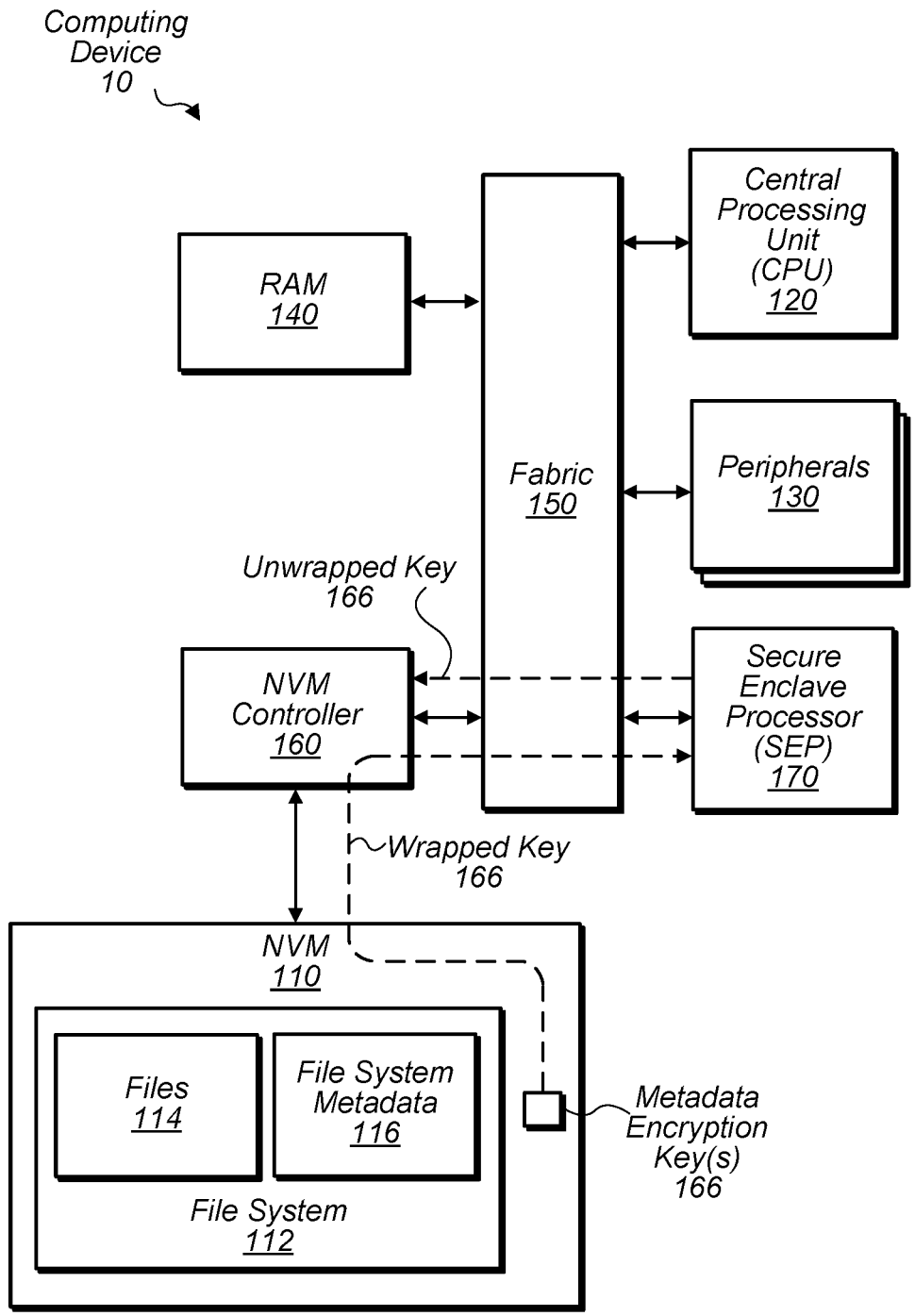
FIG. 1 is a block diagram illustrating an example of a computing device configured to implement encryption of file system metadata.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform a cryptographic operation" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a file system having multiple files, the "first" and "second" files can be used to refer to any two files. In other words, the "first" and "second" files are not limited to initial two files stored in the file system, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a computer system may encrypt the content of particular files to prevent a malicious person from gaining access to the encrypted content. While this may afford some amount of protection, it may still be possible to obtain a significant amount of information about a file based on the metadata maintained by the file system storing the file. For example, in addition to storing where a particular file is located, a modern file system may also store metadata identifying when the file was created, the size of the file, and even identify the user that created file. If a malicious person were attempting to locate a file created on a particular date by a particular user, the person could potentially identify the file and determine where it is located based on the stored metadata regardless of whether that file was encrypted. Knowing this information, the malicious person might attempt a targeted attack to breach the encrypted file, or even be able to perform some malicious act based solely on the accessible metadata.

The present disclosure describes embodiments in which a computing device is configured to encrypt the metadata that it maintains for implementing a file system. As will be described below, a computing device may encrypt metadata of a file system with a metadata encryption key that is stored with the file system. In various embodiments, the metadata encryption key is wrapped (i.e., encrypted) prior to storage by a secure circuit (referred to below as a secure enclave processor (SEP)) included in the computing device. In such an embodiment, when a processor distinct from the secure circuit (e.g., a central processing unit (CPU)) later requests access to the file system, the secure circuit may attempt to unwrap (i.e., decrypt) the encrypted metadata encryption key in order to allow the processor access to the file system metadata.

In some embodiments, the secure circuit decrypts the encrypted metadata encryption key using a decryption key derived from entropy supplied by a user and/or hardware in the computing device. In doing so, the secure circuit prevents access to the file system metadata. That is, if a user is unable to provide the correct passcode, for example, the secure circuit cannot derive the decryption key for the encrypted metadata encryption key. Still further, since the encrypted metadata cannot be decrypted as the metadata key is not decrypted, it may be difficult for a malicious person to obtain the information specified in the metadata such as where particular files are stored, when those files were created, who created those files, etc.

In some embodiments, the secure circuit does not provide the decrypted metadata encryption key to the processor requesting access to the file system, but rather provides the metadata encryption key via a secure connection to a memory controller of the memory storing the file system. The memory controller, in turn, may handle the encryption and decryption of file system metadata being accessed by the processor. In doing so, the secure circuit may prevent the metadata encryption key from being exposed to the processor. Accordingly, if the processor becomes compromised due to executing malicious software, the malicious software may not be able to gain access to the metadata encryption key and thus later access file system metadata without the user supplied entropy, for example.

Turning now to FIG. 1, a block diagram of a computing device 10 configured to encrypt file system metadata is depicted. Computing device 10 may correspond to any suitable computer system. Accordingly, in some embodiments, device 10 may be a mobile device (e.g., a mobile phone, a tablet, personal data assistant (PDA), laptop, etc.), desktop computer system, server system, network device (e.g., router, gateway, etc.), microcontroller, etc. In the illustrated embodiment, computing device 10 includes a non-volatile memory (NVM) 110, a central processing unit (CPU) 120, one or more peripherals 130, random access memory (RAM) 140, a fabric 150, a non-volatile memory (NVM) controller 160, and a secure enclave processor (SEP) 170. As shown, NVM 110 may include a file system 112, which includes files 114 and file system metadata 116. In some embodiments, computing device 10 may include more (or less components). In some embodiments, computing device 10 (or components within computing device 10) may be implemented as a system on a chip (SOC) configuration.

Non-volatile memory (NVM) 110 is a memory configured to store data of computing device 10 in a non-volatile manner. In some embodiments, NVM 110 includes various forms of solid-state memory such as NAND flash memory, NOR flash memory, nano RAM (NRAM), magneto-resistive RAM (MRAM), phase change RAM (PRAM), etc. In some embodiments, NVM 110 includes forms of memory that are not solid-state such as a hard disk drive, removable disk drive, optical drive, etc. In various embodiments, data in memory 110 is maintained in accordance with a file system 112, which groups blocks of data into files 114 having names comprehendible by a user. File system 112 may also use a structure of directories for organizing files 114 and facilitating file retrieval. In order to implement file system 112, NVM 110 may store various forms of file system metadata 116. Metadata 116 may include any of various forms of metadata used by a file system. For example, in some embodiments, metadata 116 may generally include files records that identify locations of data blocks of files 114 in memory, information about the creation and modification of files, established permissions for files, etc. In some embodiments, metadata 116 may also include directory records defining the structure of directories in file system 112 such that a given directory record may identify parent and child directories as well as the names of files included in the directory. Additional examples are present below with respect to FIG. 2. As noted above and described below, in various embodiments, a portion of metadata 116 (or all of metadata 116) is encrypted to restrict access to the metadata 116 as well as access to file system 112.

Central processing unit (CPU) 120 is a processor that may execute various software on computing device 10 that accesses data in file system 112. Accordingly, CPU 120 may include circuitry configured to execute instructions defined in an instruction set architecture implemented by processor 120. In some embodiments, CPU 120 may include multiple processor cores to support concurrent execution of program instructions. CPU 120 may also be multithreaded and operate on data stored in one or more cache levels. In various embodiments, CPU 120 executes an operating system that maintains file system 112 including the creation of metadata 116. For example, when a user creates a new directory and adds files 114 to that directory via a graphical user interface, the operating system may create new metadata 116 (or modify existing metadata 116) to reflect those changes in file system 112. The operating system may also service file requests from other applications, which may be executing on CPU 120. For example, an application may issue a request via an application programming interface (API) for the operating system to retrieve data in a particular file 114 in a particular directory. In response to receiving this request, the operating system (or merely generally CPU 120) may access metadata 116 to traverse the directory structure and determine where blocks of the file 114 are stored in NVM 110 in order to retrieve the requested data from the determined locations.

Peripherals 130 are other forms of hardware that may be configured to perform input and/or output operations for computing device 10 and may operate on data stored in file system 112. For example, in one embodiment, peripherals 130 include a touch screen configured to display frames generated by computing device 10 as well as receive user touch inputs. Peripherals 130 may include a keyboard configured to receive key presses from a user and convey that information to processor 120. Peripherals 130 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 130 may include audio peripherals such as microphones, speakers, interfaces to microphones and speakers, audio processors, digital signal processors, mixers, etc. Peripherals 130 may include interface controllers for various interfaces external to computing device 10 including interfaces such as Universal Serial Bus (USB), peripheral component interconnect (PCI) including PCI Express (PCIe), serial and parallel ports, etc. Peripherals 130 may include networking peripherals such as media access controllers (MACs). In some embodiments, peripherals 130 may interface with CPU 120 (or specifically the operating system executing on CPU 120) to access data in files 114.

Random access memory (RAM) 140 is a volatile memory that may temporarily store data from NVM 110. In some embodiments, RAM 140 may also store program instructions of an operating system and/or applications executed by CPU 120. In some embodiments, RAM 140 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.).

Communication fabric 150 is a collection of one or more communication interconnects for communicating among the components of computing device 10. Fabric 150 may be bus-based, including shared bus configurations, cross bar configurations, and hierarchical buses with bridges. Fabric 150 may also be packet-based, and may be hierarchical with bridges, cross bar, point-to-point, or other interconnects.

As noted above, computing device 10 may encrypt file system metadata 116 in order to prevent an unauthorized user from accessing metadata 116. As will be discussed below, in some embodiments, computing device 10 is configured to implement encryption of metadata 116 via NVM controller 160, one or more metadata encryption keys 166, and SEP 170.

NVM controller 160 is a memory controller configured to facilitate accessing data stored in NVM 110. Controller 160 may generally include circuitry for receiving requests for memory operations from other components of computing device 10 and for accessing NVM 110 to service those requests. Accordingly, controller 160 may include circuitry for issuing read and write commands to NVM 110, performing logical-to-physical mapping for data in NVM 110, etc. In some embodiments, controller 160 includes circuitry configured to handle various physical interfacing (PHY) functionality to drive signals to NVM 110. In various embodiments, controller 160 is configured to send data read from NVM 110 over fabric 150 to various components of computing device 10 such as RAM 140. In such an embodiment, controller 160 may be configured to implement a direct memory access (DMA) controller that coordinates DMA transactions to exchange information associated with read and write operations over fabric 150 to components 110-170. NVM controller 160 may thus be referred to as a DMA controller in some embodiments.

In various embodiments, NVM controller 160 includes circuitry configured to encrypt metadata 116 being written to NVM 110, and decrypt metadata 116 being read from NVM 110. NVM controller 160 may implement any suitable encryption algorithm for encrypting and decryption of metadata 116 such as Data Encryption Standard (DES), Advanced Encryption Standard (AES), Rivest Shamir Adleman (RSA), etc. In the illustrated embodiment, NVM controller 160 encrypts and decrypts metadata 116 with a metadata encryption keys 166. In various embodiments, keys 166 are stored in NVM 110 in a wrapped form (i.e., an encrypted form) and are inaccessible to NVM controller 160 without the assistance of SEP 170. In some embodiments, file system metadata 116 encryptions are distinct from encryption keys that are used by NVM controller 160 to encrypt files 114. Although show in FIG. 1 as residing in NVM 110, in some embodiments, a metadata encryption key 116 may be stored in a memory separate from NVM 110.

Secure enclave processor (SEP) 170 is a secure circuit configured to provide unwrapped metadata encryption keys 116 to NVM controller 160. As used herein, the term "secure circuit" refers to a circuit that protects an isolated, internal resource from being directly accessed by an external circuit such as processor 120 and peripherals 130. This internal resource may be circuitry that performs services/operations associated with sensitive data such as cryptographic circuitry configured to perform encryption and decryption of a metadata encryption key 166. This internal resource may be memory that stores sensitive data such as a supplied user credential. As will be described below with FIGS. 3A and 3B, in various embodiments, SEP 170 is configured to unwrap a metadata encryption key 116 in response to a request from CPU 120 (or more specifically the operating system executing on CPU 120) to access file system 112. In some embodiments, CPU 120 may issue this request during a boot sequence of computing device 10 in order to begin retrieving files 114 from file system 112. In some embodiments, SEP 170 is configured to unwrap a key 166 with another encryption key (e.g., a "master key") derived from entropy supplied by the user (e.g., a user-supplied credential) and/or entropy supplied by hardware in computing device 10. After unwrapping the key 166, in some embodiments, SEP 170 is configured to communicate the key 166 over a secure connection established using a shared key known only to SEP 170 and NVM controller 160. As will be described below with FIGS. 4A and 4B, in various embodiments, SEP 170 is also configured to generate and wrap metadata encryption keys 166 for storage in NVM 110. In some embodiments, SEP 170 generates wrapped keys in response to CPU 120 initializing a file system 112 on NVM 110 or in response to a user changing a credential used to derive the master key for wrapping key 166. As will be described with FIG. 5, in various embodiments, CPU 120 (or more specifically the operating system executing on CPU 120) issues requests to unwrap and generate wrapped keys 166 through a mailbox mechanism in SEP 170 configured to isolate internal circuitry from elements external to SEP 170. In such an embodiment, CPU 120 accesses the mailbox mechanism by issuing calls to an API that sends the requests to mailbox mechanism.

Figure 2:
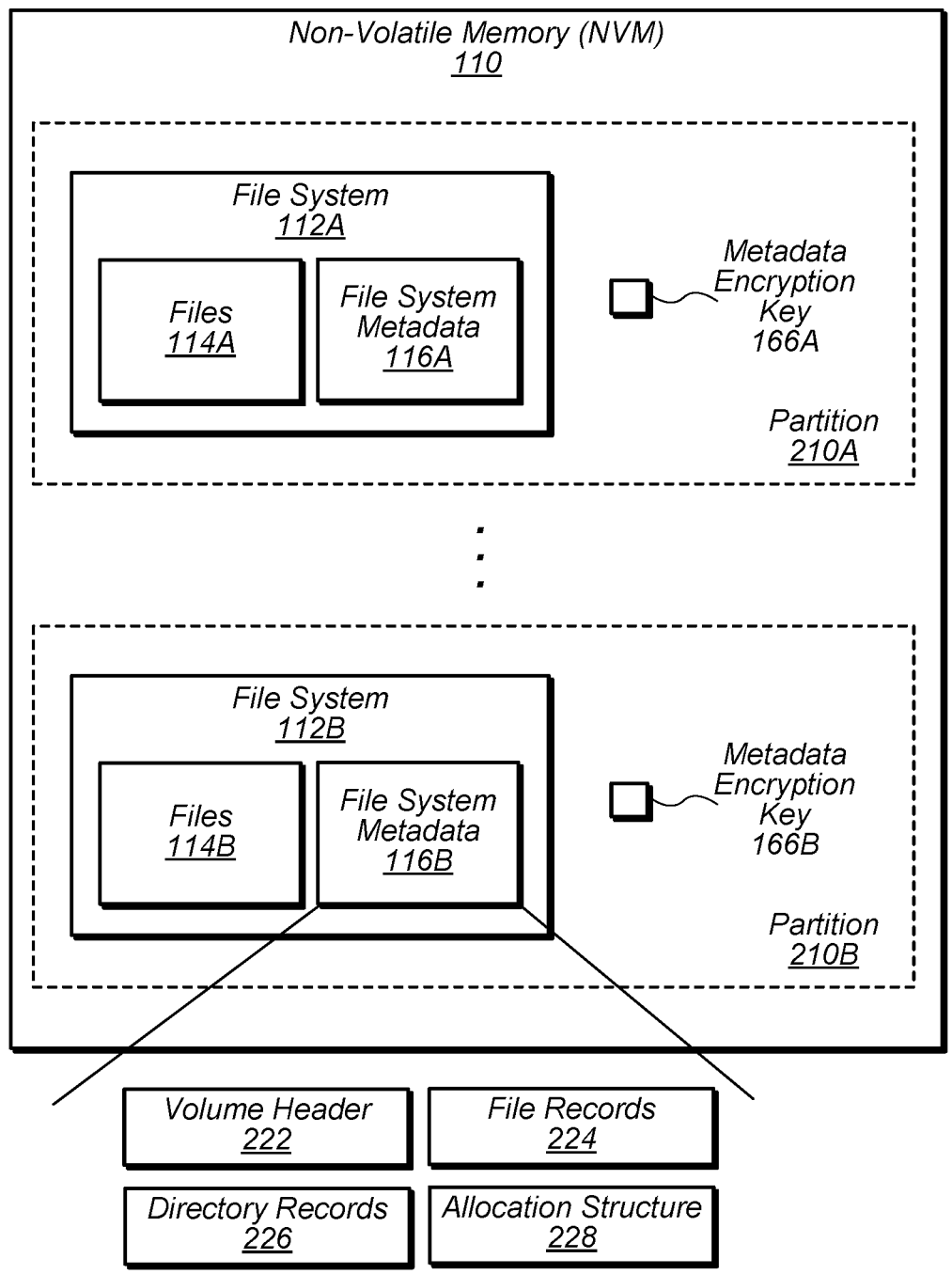
FIG. 2 is a block diagram illustrating an example of storing encrypted metadata for multiple file systems in a non-volatile memory.

Turning now to FIG. 2, a block diagram of the contents of NVM 110 is depicted in greater detail. Although a single file system 112 is depicted in FIG. 1, in some embodiments, NVM 110 may be divided into multiple partitions 210, each with respective file system 112. Each file system 112, in turn, may include a respective set of files 114 and corresponding file system metadata 116, which is encrypted with a respective metadata encryption key 166. For example, metadata encryption key 166A may be used to encrypt and decrypt metadata 116A of file system 112A in partition 210A. In some embodiments, the contents of NVM 110 may be implemented differently than shown. Accordingly, in some embodiments, NVM 110 may include a single partition 210 with a single file system 112. In some embodiments, a partition 210 may have multiple keys 166 for encrypting portions of metadata 116 (as well as separate keys for encrypting files 114). In some embodiments, partitions 210 may reside on multiple NVMs 110. In some embodiments, metadata encryption keys 166 may be located in a memory other than NVM 110.

In the illustrated embodiment, file system metadata 116 for a given file system 112 may include a volume header 222, file records 224, directory records 226, and/or allocation structure 228. In other embodiments, metadata 116 may include more (or less) elements than shown.

Volume header 222 may include general information about a partition 210 such as the partition's name, universally unique identifier (UUID), size, creation date, location of particular file system data structures, etc. In some embodiments, volume header 222 may correspond to the superblock used by UNIX-style file systems (e.g., the Extended Filesystem (EXT)), the volume header in Hierarchical File System Plus (HFS+) or $Volume in New Technology File System (NTFS). Although most of metadata 116 may be encrypted, in some embodiments, volume header 222 is a portion of metadata 116 that is not encrypted.

File records 224 may include various information about files 114 such as a node ID, creation and modification dates, file permissions, a name of user creating the file 114, a file name, etc. In some embodiments, records 224 may include inodes in EXT, file thread records and file records in the catalog file of HFS+, file information in the master file table $MFT of NTFS.

Directory records 226 may various information about the directory structure of a file system 112. A given record 226 may specify, for example, the directory's name, identifiers for parent and child directories, the files 114 included in the directory, creation and modification dates of the directory, permission information, etc. In some embodiments, records 226 may include the HTree in EXT, directory records in the catalog file in HFS+, or $MFT in NTFS.

Allocation structure 228 may include information identifying which blocks of NVM 110 have been allocated for storing data (or which blocks are free to store data). In some embodiments, allocation structure 228 may correspond to the allocation file in HFS+ or $Bitmap in NTFS.

Figure 3A:
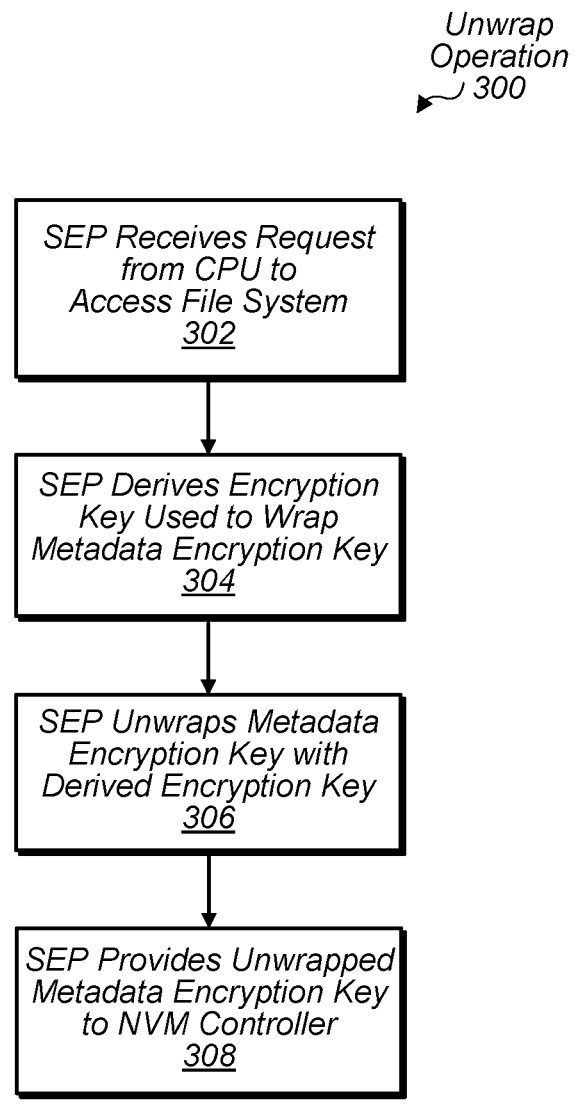
FIG. 3A is a flow diagram illustrating an example of an unwrap operation for a metadata encryption key used to encrypt file system metadata.

Turning now to FIG. 3A, a flow diagram of an unwrap operation 300 for unwrapping (i.e., decrypting) a wrapped metadata encryption key 166 is depicted. In various embodiments, computing device 10 performs unwrap operation 300 during a boot sequence of computing device 10.

In step 302, SEP 170 receives a request from CPU 120 to access file system 112. In some embodiments, this request may be issued by an operating system executing on CPU 120 and via an API for a mailbox mechanism of SEP 170. In some embodiments, this request may include a wrapped key 166 and entropy supplied by a user of device 10. In other embodiments, step 302 may include SEP 170 retrieving the key 166 from NVM 110 and asking the user to supply the entropy (e.g., via a touch screen of device 10). In some embodiments, the entropy includes a passcode comprising a sequence of alphanumeric characters. In other embodiments, the entropy may include information usable to derive a key such as biometric information collected from the user.

In step 304, SEP 170 derives the encryption key for unwrapping a wrapped key 166 based on the entropy supplied in step 302. In various embodiments, step 304 includes SEP 170 computing a key derivation function (KDF) with the entropy as an input to the function. As noted above, computing an encryption key may be based on user supplied entropy that cryptographically binds the key 166 to a user—i.e., only a user with access to the entropy can gain to access to the key 166 being unwrapped. In some embodiments, SEP 170 also inputs entropy from hardware in device 10 (e.g., a unique identity key) into the KDF to derive the encryption key. In some embodiments, the unique identity key is embedded in SEP 170 during fabrication of computing device 10 and is unique to device 10—i.e., two device 10s do not share the same identity key. SEP 170 also stores the unique identity key in a manner resistant to extraction. In doing so, a metadata encryption key 166 is cryptographically bound to a particular device 10—i.e., another device 10 would not be capable of deriving the correct encryption key as it does not include the correct unique identity key used to derive the encryption key.

In step 306, SEP 170 attempts to decrypt the key 166 with the derived key in step 304. If SEP 170 is unsuccessful, SEP 170 may indicate that the provided entropy may be incorrect and attempt to repeat operation 300. If SEP 170 is successful in decrypting the key 166, operation 300 proceeds to step 308.

In step 308, SEP 170 provides the decrypted key 166 to NVM controller 160. In various embodiments, SEP 170 also encrypts key 166 with an encryption key known to NVM controller 160 prior to sending the key 166 in order to prevent the unwrapped key 166 from being observed during transportation over fabric 150. Upon receiving the unwrapped key 166, NVM controller 160 may use the key 166 to begin decrypting file system metadata 116.

Figure 3B:
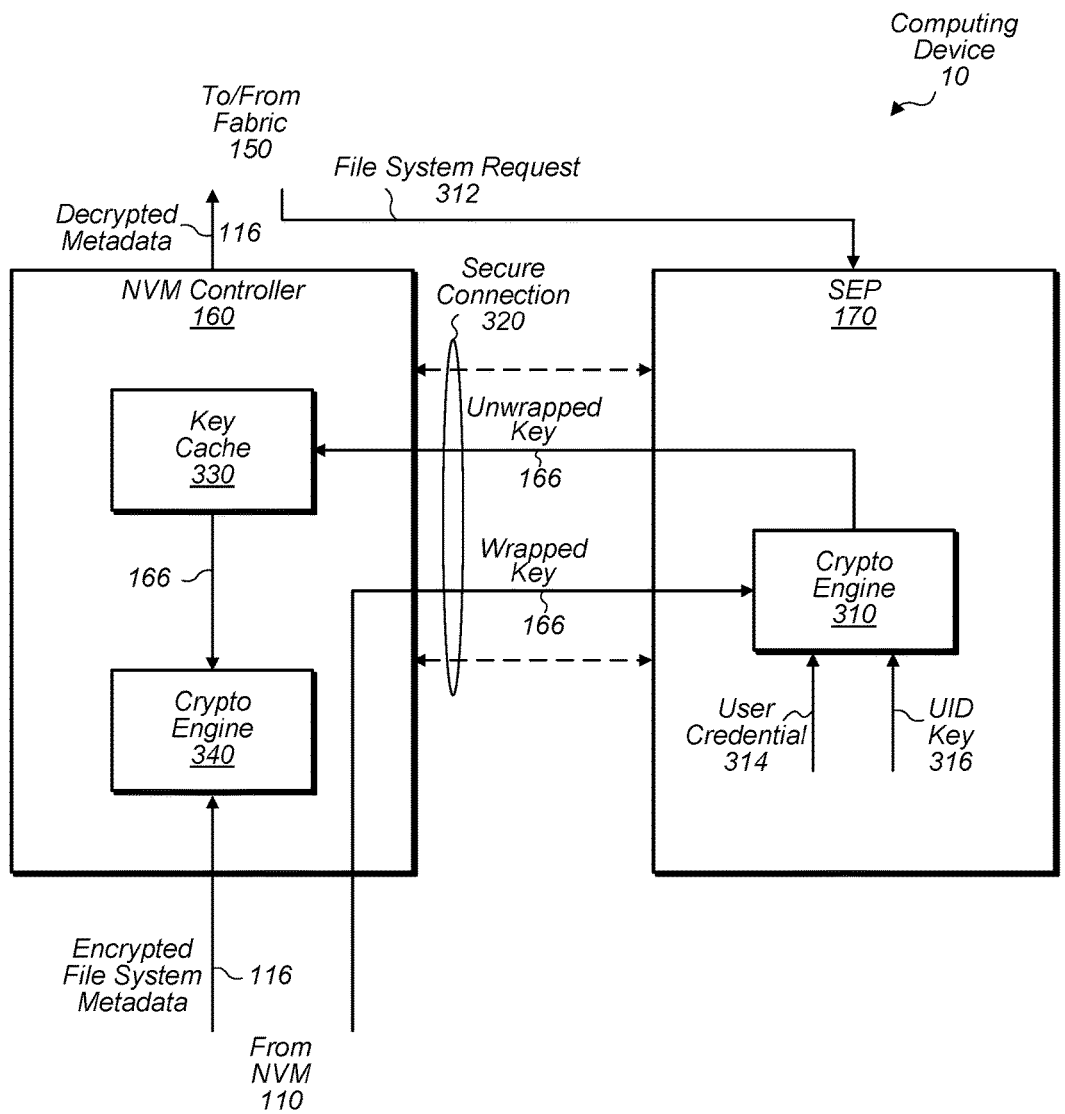
FIG. 3B is a block diagram illustrating an example of an interaction between a secure circuit and a memory controller during the unwrap operation.

Turning now to FIG. 3B, a block diagram of an exchange between NVM controller 160 and SEP 170 during unwrap operation 300 is depicted. In the illustrated embodiment, SEP 170 includes a cryptographic engine 310, and NVM controller 160 includes a key cache 330 and a cryptographic engine 340.

Cryptographic engine 310 is circuitry configured to perform cryptographic operations for SEP 170, including the decryption and encryption of a wrapped key 166 from NVM 110. Cryptographic engine 310 may implement any suitable encryption algorithm such as DES, AES, RSA, etc. As shown, an unwrap operation may begin with SEP 170 receiving a key request 312 from CPU 120 via fabric 150 as discussed above with FIG. 3A. SEP 170 may also receive a wrapped key 166 via fabric 150 after the key 166 is retrieved from NVM 110 by controller 160, and receive a corresponding user credential 314 associated with the key 166. In response to receiving this information, cryptographic engine 310 may retrieve a unique identification key 316 from key storage 550 and compute a key derivation function with credential 314 and key 316 as inputs in order to derive the encryption key for decrypting the wrapped key 166. If engine 310 is able to successfully decrypt the key 166, engine 310 may send the key 166 over secure connection 320 to key cache 330 in NVM controller 160.

Secure connection 320 is a cryptographic tunnel over fabric 150 that may be established between controller 160 and SEP 170 using a shared key known only to controller 160 and SEP 170. In some embodiments, this shared key may be stored in controller 160 and SEP 170 during fabrication of device 10. Although not shown, cryptographic engines 310 and 340 may perform encryption and decryption for secure connection 320.

Key cache 330 is a memory configured to temporarily store an instance (i.e., copy) of an unwrapped key 166 received from SEP 170. In various embodiments, a key 166 may be removed from cache 330 in response to a user powering down device 10 or restarting device 10. Cryptographic engine 340 may periodically retrieve keys 166 from cache 330 as needed.

Cryptographic engine 340 is circuitry configured to perform cryptographic operations for controller 160. As shown, engine 340 may use an unwrapped key 166 from cache 330 to decrypt metadata 116 being read from NVM 110 by NVM controller 136—e.g., when CPU 120 is performing a walk of the directory structure of file system 112. Engine 340 may also use the key 166 to encrypt metadata 116 being written to NVM 110 by controller 160—e.g., when a new file 114 is written to NVM 110 and placed in a directory.

Figure 4A:
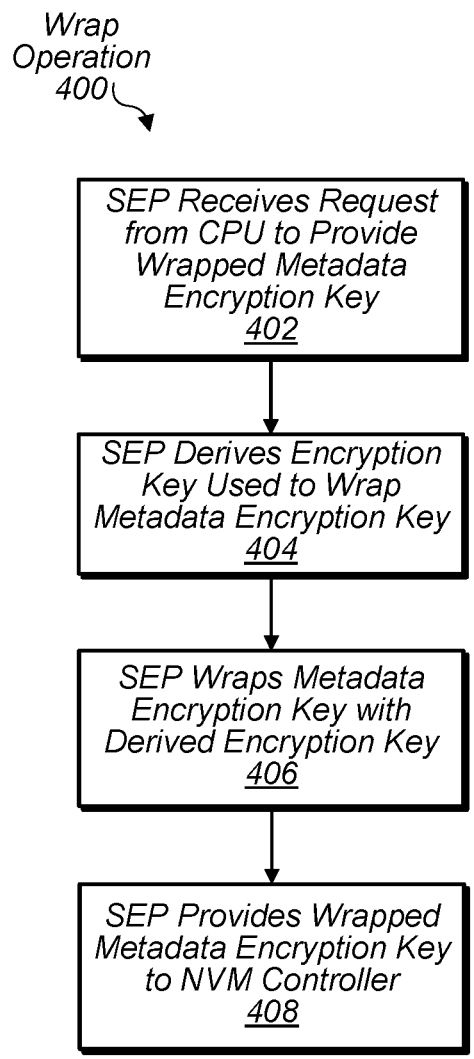
FIG. 4A is a flow diagram illustrating an example of a wrap operation for the metadata encryption key.

Turning now to FIG. 4A, a flow diagram of a wrap operation 400 for a metadata encryption key 166 is depicted. In various embodiments, computing device 10 may perform operation 400 in response to a new file system 112 being created on NVM 110 or in response to a user altering the entropy used to derive the encryption key for wrapping a key 166.

In step 402, SEP 170 receives a request from CPU 120 to provide a wrapped metadata encryption key 166 for storage in NVM 110. In some embodiments, step 402 includes SEP 170 generating the key 166. In other embodiments, SEP 170 may receive the unwrapped key from an external source, which may have generated the key 166.

In step 404, SEP 170 derives an encryption key for wrapping the metadata encryption key 116. In some embodiments, this encryption key may be derived based on a user credential 314 and a UID key 316 as discussed above. In some embodiments, if the user credential 314 is not available (e.g., because device 10 is provisioned with an initial file system 112 at fabrication), the encryption key may be derived based merely on the UID key 316. If a user credential 314 is later provided (e.g., because the user has now purchased device 10 and begun using it), in such an embodiment, SEP 170 may derive a new encryption key based on both credential 314 and UID key 316 to rewrap the previous metadata key 166 with the newly derived encryption key.

In step 406, SEP 170 wraps the key 166 with the encryption key derived in step 404. As will be described below with FIG. 4B, in some embodiments, step 406 may also include maintaining an unwrapped instance of the key 166, which may be used by cryptographic engine 340 to encrypt metadata being written to NVM 110.

In step 408, SEP 170 provides the wrapped metadata encryption key 166 to NVM controller 160 for storage in NVM 110. In some embodiments, step 408 may also include providing the unwrapped instance of the key 166 over the secure connection between controller 160 and SEP 170.

Figure 4B:
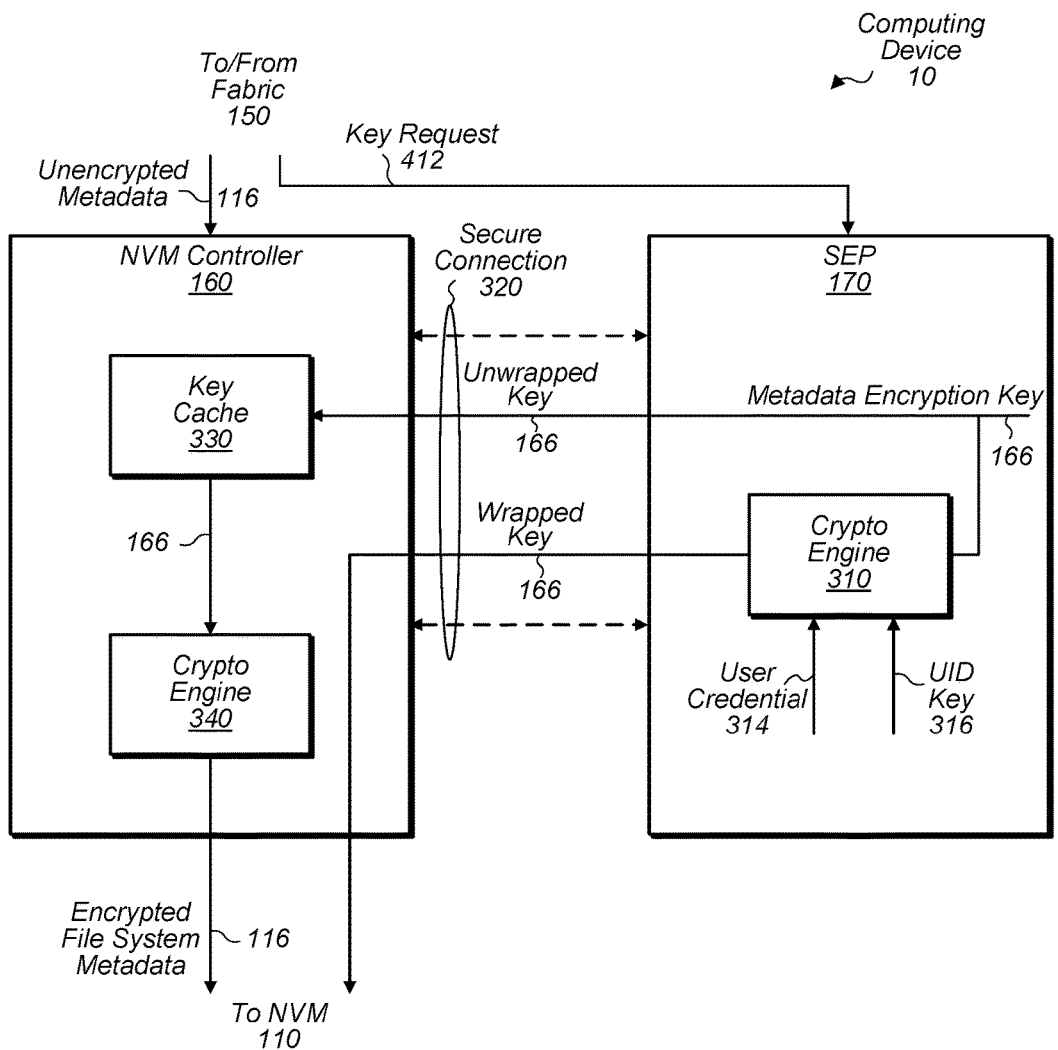
FIG. 4B is a block diagram illustrating an example of an interaction between the secure circuit and the memory controller during the wrap operation.

Turning now to FIG. 4B, a block diagram of an exchange between NVM controller 160 and SEP 170 during a wrap operation 400 is depicted. As shown, a read operation 400 may begin with SEP 170 receiving a key request 412. In response to response receiving this request, SEP 170 may generate a new metadata encryption key 166 (or receive an existing key 166 from an external source such as one created prior to device 10 having a user). In the illustrated embodiment, SEP 170 sends two copies of the key 166 to NVM controller 160 shown as wrapped key 166 and unwrapped key 166. In such an embodiment, unwrapped key 166 is stored in cache 330 for use by engine 340 to encrypt metadata 116. In the illustrated embodiment, wrapped key 166 is the encrypted copy stored in NVM 110 by NVM controller 160.

Figure 5:
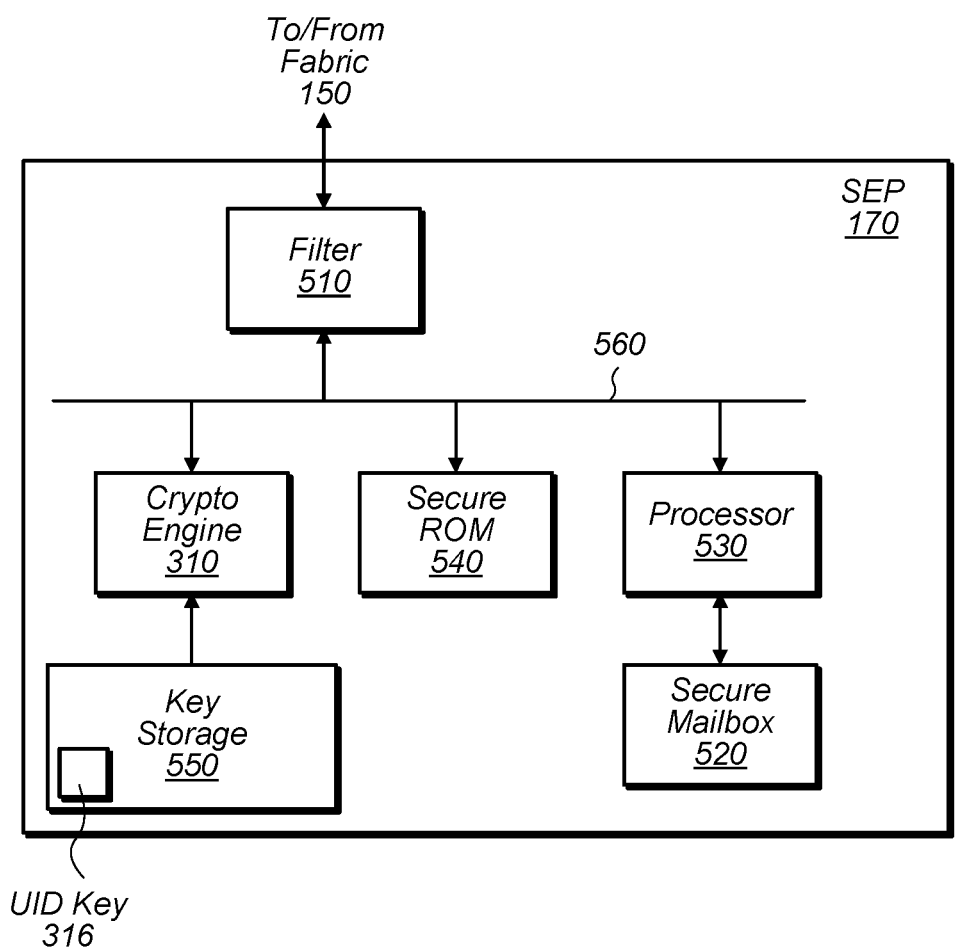
FIG. 5 is a block diagram illustrating an example of circuitry included in the secure circuit.

Turning now to FIG. 5, a block diagram of additional components in SEP 170 is depicted. In the illustrated embodiment, SEP 170 includes a filter 510, secure mailbox 520, processor 530, secure ROM 540, cryptographic engine 310, and key storage 550 coupled together via an interconnect 560. In some embodiments, SEP 170 may include more (or less) components than shown in FIG. 5. As noted above, SEP 170 is a secure circuit that protects an internal, resource such as components 530-550 and 310. As discussed below, SEP 170 implements a secure circuit through the use of filter 510 and secure mailbox 520.

Filter 510 is circuitry configured to tightly control access to SEP 170 to increase the isolation of the SEP 170 from the rest of the computing device 10, and thus the overall security of the device 10. More particularly, in one embodiment, filter 510 may permit read/write operations from the communication fabric 150 to enter SEP 170 only if the operations address the secure mailbox 520. Other operations may not progress from the fabric 150 into SEP 170. Even more particularly, filter 510 may permit write operations to the address assigned to the inbox portion of secure mailbox 520, and read operations to the address assigned to the outbox portion of the secure mailbox 520. All other read/write operations may be prevented/filtered by the filter 510. In some embodiments, filter 510 may respond to other read/write operations with an error. In one embodiment, filter 510 may sink write data associated with a filtered write operation without passing the write data on to local interconnect 560. In one embodiment, filter 510 may supply nonce data as read data for a filtered read operation. Nonce data (e.g., "garbage data") may generally be data that is not associated with the addressed resource within the SEP 170. Filter 510 may supply any data as nonce data (e.g. all zeros, all ones, random data from a random number generator, data programmed into filter 510 to respond as read data, the address of the read transaction, etc.).

In various embodiments, filter 510 may only filter incoming read/write operations. Thus, the components of the SEP

170 may have full access to the other components of computing device 10 including CPU 120 and NVM controller 160. Accordingly, filter 510 may not filter responses from fabric 150 that are provided in response to read/write operations issued by SEP 170.

Secure mailbox 520 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from the fabric 150 (e.g. issued by CPU 120). The outbox may store write data from write operations sourced by processor 530 (which may be read by read operations sourced from fabric 150, e.g. read operations issued by CPU 120). (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 120 (or hardware such as peripherals 130) may request services of SEP 170 via an application programming interface (API) supported by an operating system of computing device 10—i.e., a requester may make API calls that request services of SEP 170. These calls may cause corresponding requests to be written to mailbox mechanism 520, which are then retrieved from mailbox 520 and analyzed by processor 530 to determine whether it should service the requests. Accordingly, this API may be used to request the unwrapping of keys 166 as well as the wrapping of keys 166. By isolating SEP 170 in this manner, secrecy of maintained keys 166 may be enhanced.

SEP processor 530 is configured to process commands received from various sources in computing device 10 (e.g. from processor 120) and may use various secure peripherals to accomplish the commands. In the case of operations that involve keys 166, SEP processor 530 may provide appropriate commands to cryptographic engine 310 in order to perform those operations. In various embodiments, SEP processor 530 may execute securely loaded software that facilitates implementing functionality descried with respect to SEP 170. This software may include encrypted program instructions loaded from a trusted zone in NVM 110 or secure ROM 540.

Secure ROM 540 is a memory configured to program instruction for booting SEP 170. In some embodiments, ROM 540 may respond to only a specific address range assigned to secure ROM 540 on local interconnect 560. The address range may be hardwired, and processor 530 may be hardwired to fetch from the address range at boot in order to boot from secure ROM 540. Filter 510 may filter addresses within the address range assigned to secure ROM 540 (as mentioned above), preventing access to secure ROM 540 from components external to the SEP 170. In some embodiments, secure ROM 540 may include other software executed by SEP processor 530 during use. This software may include the program instructions to process inbox messages and generate outbox messages, code to interface to the cryptographic engine 310, etc.

Key storage 550 is a local memory (i.e., internal memory) configured to store keys such as UID key 316. In some embodiments, storage 550 may use different techniques for the storage of keys. For example, in one embodiment, storage 550 includes a set of fuses that are burnt during a fabrication of SEP 170 (or more generally device 10) in order to record key 316. In another embodiment, storage 550 may include a non-volatile memory for the storage of keys such as key 316.

Figure 6:
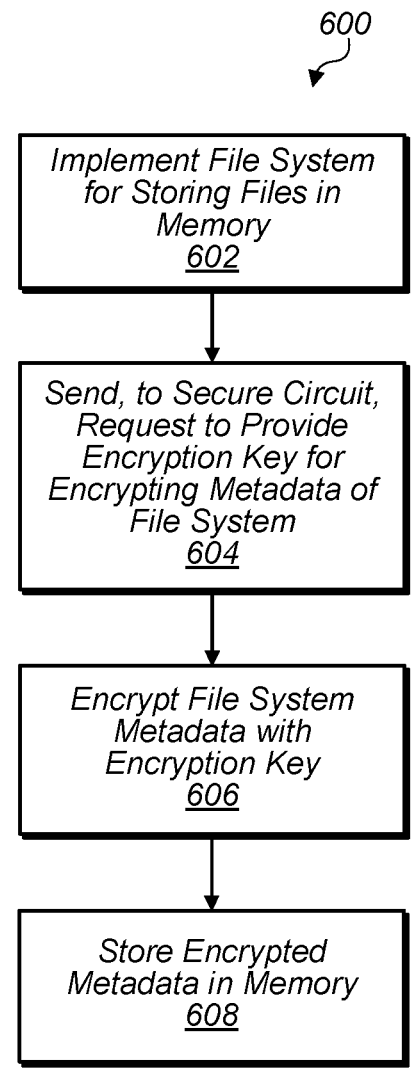
FIG. 6 is a flow diagram illustrating an example of a method performed by the computing device.

Turning now to FIG. 6, a flow diagram of a method 600 for implementing a file system with encrypted metadata is depicted. Method 600 is one embodiment of a method performed by a computing device such as computing device 10 in order to securely store information. In some embodiments, portions of method 600 may be performed by an operating system executing on a processor of the computing device such as CPU 120. In some embodiments, steps of method 600 may be performed in a different order than shown and/or in parallel.

In step 602, a file system (e.g., file system 112) is implemented for storing files (e.g., files 114) in a memory (e.g., NVM 110) of the computing device, where the file system includes metadata (e.g., metadata 116) about the files. In some embodiments, step 602 may include formatting a memory and initialize various data structures used by the file system (e.g., structures 222-228). In some embodiments, step 602 includes updating the metadata as new directories and files are written to the memory over time.

In step 604, a request (e.g., request 412) to provide an encryption key (e.g., metadata encryption key 166) for encrypting the metadata is sent to a secure circuit (e.g., SEP 170) of the computing device. In various embodiments, the secure circuit is isolated from access except through a mailbox mechanism (e.g., secure mailbox 520) accessible by an API. In such an embodiment, step 604 may include calling the API to send the request to the secure circuit. In some embodiments, step 604 may also include providing a user supplied credential (e.g., credential 314) to the secure circuit to encrypt the encryption key using another encryption key derived from the credential and storing the encrypted encryption key in the memory with the file system.

In step 606, the metadata is encrypted with the provided encryption key. In some embodiments, step 606 may include the encryption key being provided to a direct memory access (DMA) controller (e.g., NVM controller 160) configured to receive the metadata over a system bus (e.g., fabric 150) and perform encryption of the metadata with the encryption key.

In step 608, the encrypted metadata is stored in the memory. As discussed above, this metadata may later be retrieved and decrypted in order to access files in the file system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
  a processor;
  memory having a first file system stored therein, wherein the first file system includes metadata for accessing a plurality of files in the memory, wherein the metadata includes directory records of the first file system, and wherein the metadata is encrypted with a metadata encryption key that is stored in an encrypted form; and
  a secure circuit having cryptographic circuitry isolated from direct access by the processor, wherein the secure circuit is configured to:
    receive a request from the processor to access the first file system; and
    in response to the request, decrypt, via the cryptographic circuitry, the encrypted form of the metadata encryption key; and
  a memory controller circuit coupled to the memory, wherein the memory controller circuit is configured to:
    receive the metadata encryption key from the secure circuit;
    retrieve the encrypted metadata from the memory; and
    decrypt the encrypted metadata prior to providing the decrypted metadata to the processor.

2. The computing device of claim 1, wherein the secure circuit is further configured to:
  prior to providing the metadata encryption key to the memory controller circuit, encrypt the metadata encryption key with a shared encryption key known to the memory controller circuit.

3. The computing device of claim 1, wherein the memory controller circuit is further configured to:
  receive a request from the processor to write new metadata of the first file system to the memory;
  encrypt the new metadata with the metadata encryption key received from the secure circuit; and
  send the encrypted new metadata to the memory for storage.

4. The computing device of claim 3, wherein the new metadata includes a record for a directory, wherein the record identifies names for a plurality of files stored in the directory.

5. The computing device of claim 1, wherein the secure circuit is further configured to:
  receive a credential supplied by a user of the computing device; and
  based on the credential, derive a decryption key for decrypting the encrypted form of the metadata encryption key.

6. The computing device of claim 5, further comprising:
  a touch screen configured to:
    receive a passcode from the user; and
    provide the passcode to the secure circuit as the credential.

7. The computing device of claim 5, wherein the secure circuit is further configured to:
  store a unique identifier indicative of the computing device; and
  derive the decryption key based on the supplied credential and the stored unique identifier.

8. The computing device of claim 1, wherein the memory has a first partition and a second partition stored therein, wherein the first partition includes encrypted metadata of a first system that is encrypted with a first metadata encryption key, and wherein the second partition includes encrypted metadata of a second file system that is encrypted with a second metadata encryption key.

9. The computing device of claim 1, wherein the secure circuit is further configured to communicate with the processor via a mailbox mechanism configured to isolate circuitry of the secure circuit from being accessed by the processor.

* * * * *